Feb. 19, 1924.
H. V. WELCH
1,483,999
PROCESS OF RECOVERING METALS FROM THEIR ORES
Filed July 19, 1921
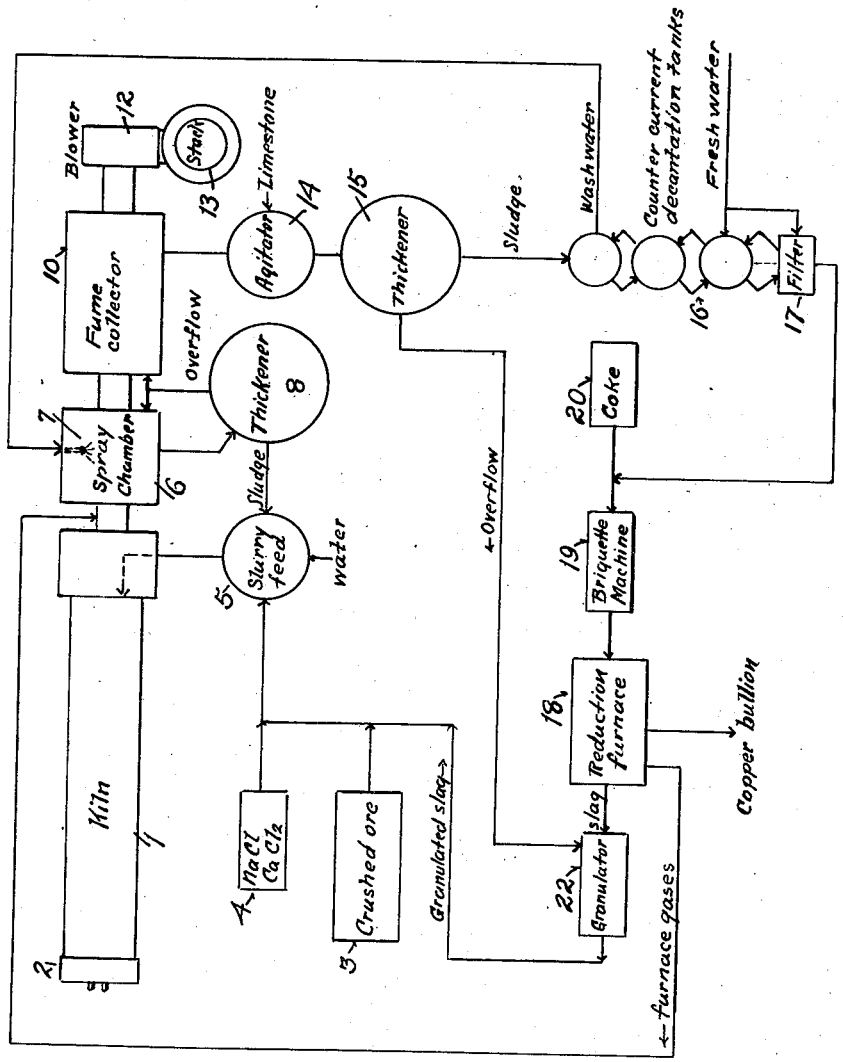
INVENTOR.
Harry V. Welch
BY Arthur P. Knight
ATTORNEY Patented Feb. 19, 1924.

1,483,999

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS OF RECOVERING METALS FROM THEIR ORES.

Application filed July 19, 1921. Serial No. 485,920.

*To all whom it may concern:*

Be it known that I, HARRY V. WELCH, a citizen of the United States, residing at Los Angeles, in the county of Los Angeles and State of California, have invented a new and useful Process of Recovering Metals from Their Ores, of which the following is a specification.

This invention relates to the recovery of copper and other metals from their ores by what is known as the volatilization process in which the metallic values of the ore are converted by heat and suitable reagents to the form of fume, which is condensed and collected so as to provide the metallic values in concentrated form.

As generally carried out for the recovery of copper the volatilization process involves the conversion of the copper to the form of chlorid, the copper chlorid being volatilized and the fume containing such chlorid being collected by electrical precipitation, or otherwise. In order to recover the copper in metallic form from the resulting fume product it is desirable to smelt the fume, or subject it to heating operation in a suitable furnace along with a reducing agent. By reason of the volatile nature of the copper chlorid the smelting of the fume containing such chlorid is a matter of some difficulty, as the metallic values in the fume tend to pass off or re-volatilize when subjected to the necessary temperature required for smelting.

The main object of the present invention is to provide a process whereby the copper in the fume is converted into a relatively non-volatile compound, which may be smelted without undue loss of copper by volatilization.

A further object of the invention is to carry out the process in such manner that the product which is eventually smelted is substantially free from chlorine, including not only the chlorine carried by the copper content of the fume, but also any other chlorine which may be present in the fume, for example, residual chloridizing agent used in the volatilizating operation and carried over with the fume. The presence of such excess chlorine is also objectionable in the smelting operation for the reason that it tends to increase the volatilization of the copper content in the fume in the smelting operation and, by substantially removing chlorine from the fume, loss by volatilization in smelting the fume is substantially or largely eliminated.

Another object of the invention is to carry out the process in such manner that the product which is smelting is more concentrated as regards metallic values than the fume resulting from the primary volatilization operation.

A further object of the invention is to so carry out the process that the chlorine removed from the fume is brought into a condition for reuse in cyclic operation by the volatilization process.

The accompanying drawing is a flow sheet of the process.

I will describe my invention as applied to the recovery of copper from ores thereof, for example, oxidized ores, or sulfid ores, which have been roasted sufficiently for the operation of the process.

The suitably crushed or divided ore is heated in a furnace or kiln, indicated at 1, the same being, for example, a rotary kiln provided with a hood or burner 2 for projecting a flame thereinto to heat the ore passing through the kiln to a sufficiently high temperature to cause volatilization of the copper content, or a portion therof, a suitable chloridizing agent being added along with the ore to enable such volatilization to be effected. The crushed or divided ore may be drawn from the bin, or other suitable supply means, indicated at 3, and a chloridizing agent, such as sodium chlorid, or calcium chlorid, may be drawn from the supply means 4, and pass along with the ore to a feeding means 5, which is preferably a slurry feed device feeding the mixture of ore and chloridizing agent, along with water, in the form of a slurry to the kiln or furnace 1.

The hot gases produced in the kiln or furnace 1 pass to a spray chamber or dust collecting chamber 6, which may be provided with spray means 7 for distributing water or solution thereinto so as to wash out the dust or heavier particles and at the same time cool the gases. The resulting sludge collected in the spray chamber and containing such heavier or coarser particles pass to a thickener 8 of any suitable type, the thickened sludge passing therefrom back to the slurry feed device 5. This thickened sludge consists largely of gangue material blown from the kiln or furnace 1 in the form of dust but also contains some metallic values and is, therefore, preferably returned to the feed, as indicated. By reason of the cooling of the gases and vapors passing from the furnace or kiln through the spray chamber the metallic vapor, which, in the case of the treatment of copper ore with sodium chlorid, or calcium chlorid, consists largely of copper chlorid, will be collected in the form of fume in the fume collector 10 through which the gases pass after leaving the spray chamber. This fume collector may be an electrical precipitator of the type shown in the patent to H. A. Burns—No. 1,250,088—December 11th, 1917—or in the patent to H. V. Welch—No. 1,338,271—April 27th, 1920—in which the fume is collected in or on a stream of liquid. Other types of electrical precipitators may, however, be used for the purpose and the fume may be collected in dry or semi-dry condition and treated afterward with solution in the manner hereinafter described. A part of the overflow from the thickener or decantation device 8 may pass to the fume collector 10 in case the mode of operation of same requires the application of a liquid, for example, in the case of a wet electrical precipitator, as above referred to, or in the case a spray tower or absorption tower is used. Another part of the overflow from the thickener or decantation device 8 may pass to the spray chamber 7 as a part of the liquid sprayed thereinto. The residual gases or barren gases may be drawn from the fume collector 10 by means of a blower 12 and and may pass off through a stack 13.

The fume collected in the apparatus 10 and containing metallic values, such as chlorides of copper, lead, zinc, silver, or other metals to be recovered, passes to an agitator, indicated at 14, wherein it is treated with a precipitating agent in the presence of water, such water being either supplied with the fume in case the values are being collected in a wet way, or being added to the fume after collection. In the case of fume containing chlorid of copper resulting from application of the volatilization process to copper-bearing ores, I prefer to use powdered limestone as the precipitating agent, the finely divided limestone being agitated in the apparatus 14 with the copper chlorid-bearing fume and water, resulting in the production of basic copper carbonate and calcium chlorid. The sludge from the agitator 14 is passed to a thickener 15 wherein the solution containing calcium chlorid is separated from the sludge containing the precipitated copper carbonate, together with gangue, and said solution passing off from the overflow of the thickener to a later stage of the process, as hereinafter described and the sludge containing the precipitated basic copper carbonate passing preferably to a series of counter current decantation tanks 16 wherein it is washed with fresh water, the washings being returned to the cycle of operations, for example, to the spray chamber 7, and the solids being filtered off at 17.

The solids produced in the above described manner and containing the metallic values of the volatilized fume are passed to a reduction furnace, indicated at 18, being preferably first briquetted in a suitable apparatus 19, together with coke furnished from a source of supply 20. The operation of the reduction furnace 18 in usual manner reduces the basic carbonate of copper to bullion. The gases passing off from the reduction furnace may pass, as indicated, to the inlet of spray chamber 6 and the slag from the said furnace may be granulated in a suitable apparatus 22 and added to the feed of the kiln 1. This slag is preferably granulated by subjecting it while still hot to contact with the overflow of the thickener 15 containing the calcium chlorid produced by reaction of the copper chlorid with the limestone in the agitator 14. Consequently the granulated slag supplied to the feed of the kiln 1 contains a large proportion of the chlorine originally supplied to the material passing to the kiln and, in fact, by the above described operation the major portion of the chlorine may be continually returned to the kiln in the form of calcium chlorid so that only sufficient sodium chlorid or calcium chlorid need be added to the slurry to make up for waste.

The invention may also be applied to the recovery of metals other than copper, for example, lead and zinc. In case lead is present and there is no considerable amount of sulfur in the kiln gases, then sulfuric acid may be added to the mixture of collected lead chlorid fume and water to precipitate lead sulfate and then alkali, or alkali earth carbonate, oxid, or hydroxid added to neutralize the hydrochloric acid present and convert the chlorine to a form suitable for return to the kiln, namely, as alkali chlorid, or alkali-earth chlorid. Lead sulfate may then be separated from the gangue and other metal values, if any are present, in the usual manner; or gypsum, or magnesium sulfate may be agitated with the mixture of collected lead chlorid fume and water to produce a precipitate of lead sulfate and recover the chlorine in the form of calcium chlorid, or magnesium chlorid, which may be returned to the kiln; or sufficient sulfur may be fed to the kiln to convert the volatilized lead to the form of lead sulfate, the collecting operation being preferably carried out in the presence of water and the resulting sludge being treated with suitable absorbing agents to recover the chlorine in the form of alkali or alkaline earth chlorid.

In case zinc is present in the ore, it may be collected in the form of zinc chlorid, which is brought into solution in any suitable manner and precipitated, for example, by means of an alkali or alkaline earth oxid, or hydroxid, such operation producing at the same time alkali or alkaline earth chlorid for cyclic use in the process.

In the case of an ore containing copper, lead and zinc, or any two of these metals, separation of same may be effected by first treating the collected fume in the presence of water with an alkali or alkaline earth sulfate (gypsum) to precipitate the lead as sulfate, the solution being then separated and treated with alkaline earth carbonate (limestone) to precipitate coper as the basic carbonate, and the solution being again separated from the solids and treated with an alkali or alkaline earth hydroxid (calcium hydrate) to precipitate the zinc as hydrate.

The chlorine associated with each of the metallic constituents is in each of the above cases converted to the form of an alkali or alkaline earth chlorid, which is returned to the volatilization stage of the operation for use on a further quantity of ore, so that the chlorine, or a large proportion of same used in the volatilization operation, is continually recovered and reused and ony sufficient fresh chlorine, or chlorid (sodium chlorid, for example), need be added to make up for unavoidable losses in the operation.

In each of the above described precipitating operations it may be necessary or desirable to apply heat to the solution during the agitating and precipitating operations in order to accelerate the precipitating operation and it will be understood that where several metals are present decantation or filtration, or both decantation and filtration, may be necessary after each precipitating operation to separate the precipitate from the solution before the solution is subjected to the next precipitating operation, so as to obtain the precipitates of the metals, for example, lead, copper and zinc, in separate condition, the process being, therefore, effective for separation as well as recovery of the several metals from their ores.

In case gold, or silver, or both, are present in the ore, they will be precipitated with the other metallic values above referred to, the gold and a part of the silver being precipitated along with the lead in the first precipitation, and the remainder of the silver being precipitated along with the copper.

The metallic values precipitated as above described including lead, copper and zinc, or any one or more of these metals, are in the form of an oxygen-bearing compound of relatively low volatility and may be further treated by smelting to recover the metal in the form of bullion without objectionable loss from volatilization of the metal-bearing fumes.

What I claim is:

1. The process of recovering metals from their ores which consists in subjecting the ores in the presence of an alkali or an alkaline earth chlorid to sufficient heat to volatilize metallic values of the ores in the form of chlorid, collecting the resulting fumes of metallic chlorid, and treating the collected fumes in the presence of water with an alkali or alkaline earth compound capable of reacting with the metallic chlorid in the fume to precipitate the metallic values in a form less volatile than the said chlorid and to produce an alkali or alkaline earth chlorid for cyclic use in the process.

2. The process of recovering metallic values from ores, which consists in heating the ore in the presence of a chloridizing agent, to cause such metallic values to be volatilized in the form of chlorid, subjecting the gases produced in said operation to the action of liquid spray to separate dust therefrom, returning the solid material so collected to the volatilization stage of the process, collecting the fume remaining in the gases after removal of such dust, treating said fume in the presence of water with a reagent capable of precipitating the said metallic values in a form less volatile than the said chlorid, and of forming a soluble compound containing the chlorid of said metallic chlorid, separating said soluble compound from the precipitate containing the metallic values, and returning said soluble chlorid containing compound to the volatilization operation.

3. The process of recovering metallic values from ores, which consists in heating the ore in the presence of a chloridizing agent to volatilize metallic values in the form of chlorid, collecting the resulting fume containing such chlorid, treating the fume in the presence of water with a reagent adapted to precipitating the metallic values in oxidized, relatively non-volatile fume, and to producing a soluble chlorid capable of acting as a chloridizing agent in cyclic operation of the process, separating such precipitate from the soluble chlorid, subjecting the precipitate to reducing operation by the action of heat and a reducing agent, to produce metal and slag, and returning such slag, together with the aforesaid soluble chlorid, to the volatilization stage of the operation.

4. The process of recovering and separating metallic values from ores of lead and copper, which consists in heating the ore in the presence of a chloridizing agent to volatilized lead and copper values in the form of chlorid, collecting the resulting fume containing such chlorid, treating the fume in the presence of water with a sulfate of an alkali or alkaline earth metal to precipitate the lead as sulfate and to produce in solution a chlorid of the alkali or alkaline earth metal, separating the resulting precipitate from the solution, treating the solution with alkali or alkaline earth carbonate to precipitate the copper as basic carbonate and to produce in solution an alkali or alkaline earth metal chlorid, separating the resulting precipitate from the solution and utilizing the alkali or alkaline earth metal chlorid obtained in the aforesaid operations as a chloridizing agent in cyclic operation of the process.

5. The process of recovering and separating metallic values from ores of lead and zinc, which consists in heating the ore in the presence of a chloridizing agent to volatilize lead and zinc values in the form of chlorid, collecting the resulting fume containing such chlorid, treating the fume in the presence of water with a sulfate of an alkali or alkaline earth metal to precipitate the lead as sulfate and to produce in solution a chlorid of the alkali or alkaline earth metal, separating the resulting precipitate from the solution, treating the solution with alkali or alkaline earth hydrate to precipitate the zinc as hydrate and to produce in solution alkali or alkaline earth metal chlorid, separating the resulting precipitate from the solution and utilizing the alkali or alkaline earth metal chlorid obtained in the aforesaid operations as a chloridizing agent in cyclic operation of the process.

6. The process of recovering and separating metallic values from ores containing copper, lead and zinc, which consists in heating the ore in the presence of a chloridizing agent to volatilize chlorids of copper, lead and zinc, collecting such chlorids and treating same in the presence of water with alkali or alkaline earth metal sulfate to precipitate lead in the form of sulfate and to produce in solution an alkali or alkaline earth metal chlorid, separating the resulting solution from the precipitate and treating it with an alkaline earth metal carbonate to precipitate copper as basic carbonate and to produce in solution a further quantity of an alkali or alkaline earth metal chlorid, separating the resulting solution from the precipitate and treating same with alkali or alkaline earth metal hydrate to precipitate zinc as hydrate and to produce in solution a further quantity of alkali or alkaline earth metal chlorid and utilizing the alkali or alkaline earth metal chlorid produced in each of the aforesaid precipitating operations as a chloridizing agent in cyclic operation of the process.

7. The process of recovering and separating metallic values from ores of copper and zinc, which consists in heating the ore in the presence of a chloridizing agent to volatilize copper and zinc values in the form of chlorids, collecting the resulting fume containing such chlorids, treating the fume in the presence of water with an alkaline earth metal carbonate to precipitate copper as basic carbonate and to produce in solution an alkali or alkaline earth metal chlorid, separating the resulting precipitate from the solution and treating the solution with an alkali or alkaline earth metal hydrate to precipitate zinc as hydrate and to produce in solution a further quantity of alkali or alkaline earth metal chlorid, separating the solution from the precipitate and using the alkali or alkaline earth metal chlorid obtained in the aforesaid operations as a chloridizing agent in cyclic operation of the process.

8. The process of recovering copper values from ores thereof, which consists in heating the ore in the presence of a chloridizing agent to volatilize copper values in the form of chlorid, collecting the resulting fume containing copper chlorid, treating the fume in the presence of water with an alkali or alkaline earth metal carbonate to precipitate copper values and to produce a solution containing alkali or alkaline earth metal chlorid, separating the resulting solution from the precipitate and utilizing such alkali or alkaline earth metal chlorid as a chloridizing agent in cyclic operation of the process.

In testimony whereof I have hereunto subscribed my name this 12th day of July, 1921.

HARRY V. WELCH.